(12) United States Patent
Matsubara et al.

(10) Patent No.: US 9,207,826 B2
(45) Date of Patent: Dec. 8, 2015

(54) TOUCH PANEL, AND TOUCH PANEL DISPLAY DEVICE

(71) Applicant: Sharp Kabushiki Kaisha, Osaka (JP)

(72) Inventors: Kunio Matsubara, Yonago (JP); Katsunori Misaki, Yonago (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/346,934

(22) PCT Filed: Sep. 21, 2012

(86) PCT No.: PCT/JP2012/074259
§ 371 (c)(1),
(2) Date: Mar. 24, 2014

(87) PCT Pub. No.: WO2013/047381
PCT Pub. Date: Apr. 4, 2013

(65) Prior Publication Data
US 2014/0240623 A1    Aug. 28, 2014

(30) Foreign Application Priority Data
Sep. 26, 2011    (JP) .................. 2011-209820

(51) Int. Cl.
*G06F 3/044* (2006.01)
*G02F 1/1333* (2006.01)
(52) U.S. Cl.
CPC ............ *G06F 3/044* (2013.01); *G02F 1/13338* (2013.01); *G06F 2203/04111* (2013.01)

(58) Field of Classification Search
CPC .......... G06F 2203/04111; G06F 3/044; G02F 1/13338; G02F 1/1333
See application file for complete search history.

(56) References Cited

U.S. PATENT DOCUMENTS

| 2008/0309635 | A1 |   | 12/2008 | Matsuo |          |
|---|---|---|---|---|---|
| 2010/0328228 | A1 | * | 12/2010 | Elias | 345/173 |
| 2011/0018829 | A1 | * | 1/2011 | Peng | 345/173 |
| 2012/0081334 | A1 | * | 4/2012 | Kim et al. | 345/174 |
| 2012/0325639 | A1 | * | 12/2012 | Scuderi et al. | 200/600 |

FOREIGN PATENT DOCUMENTS

| JP | 2001-100647 A | 4/2001 |
|---|---|---|
| JP | 2008-310550 A | 12/2008 |

* cited by examiner

*Primary Examiner* — Md Saiful A Siddiqui
(74) *Attorney, Agent, or Firm* — Chen Yoshimura LLP

(57) ABSTRACT

Provided is a touch panel configured to minimize electrode disconnection caused by swelling of the insulating layer during the production process. The touch panel is equipped with: an insulating substrate; first island-shaped electrodes (111) disposed along a first direction; second island-shaped electrodes (121) disposed along a second direction intersecting the first direction; a connecting member (112) for connecting together the first island-shaped electrodes (111); an insulating film (15) formed covering a portion of the connecting member (112); and a relay electrode (122) for connecting together the second island-shaped electrodes (121) over the insulating film (15). The relay electrode (122), in a section thereof that overlaps the connecting member (112) in a plan view, is narrower in width, in a direction perpendicular to the second direction, than the width of the insulating film (15). A pair of edges (15a) and (15b) of the insulating film (15) is covered by the first island-shaped electrode (111), the second island-shaped electrode (121), or the relay electrode (122).

10 Claims, 13 Drawing Sheets

TOUCH PANEL, AND TOUCH PANEL DISPLAY DEVICE

TECHNICAL FIELD

The present invention relates to a touch panel and a display device equipped with this touch panel, and more specifically refers to a capacitive touch panel and a display device with this touch panel.

BACKGROUND ART

Capacitive type touch panels have recently become popular due having a high degree of practical use such as being capable of multi-position detection.

Japanese Patent Application Laid-Open Publication No. 2008-310550 discloses a touch panel (capacitive input device) in which first and second electrode patterns are formed on the same plane so as to extend in respective directions that intersect. In this touch panel, at an intersection between the first and second electrode patterns, one set of electrode patterns is connected and the other set of electrode patterns is disconnected. An insulating film (interlayer insulating film) is formed in this intersection, and on this insulating film, a relay electrode connecting together the disconnected electrode patterns is formed.

Japanese Patent Application Laid-Open Publication No. 2001-100647 discloses a substrate device that has been planarized by forming grooves in the substrate, with wiring lines being partially embedded in these grooves. In this substrate device, wiring lines are formed wider in portions where the wiring lines cross the steps formed by the grooves than in other portions.

SUMMARY OF THE INVENTION

According to the configuration of the touch panel disclosed in Japanese Patent Application Laid-Open Publication No. 2008-310550, the relay electrodes are formed on the insulating film. On the other hand, the process of forming the relay electrodes and the like, which is performed after forming the insulating films, includes washing, developing, resist removal, and the like. Thus, the insulating film is exposed to alkaline solutions, water, and the like.

There are cases in which the alkaline solutions, water, and the like, enter the insulating film from portions where the insulating film is not covered by the relay electrode. As a result, there are cases in which the insulating film swells, causing disconnections in the relay electrode formed thereon.

The substrate device disclosed in Japanese Patent Application Laid-Open Publication No. 2001-100647 has an improved wiring line reliability at the step portion by forming the wiring line to be wider where it crosses the step portion. However, if the base layer including this step is exposed and the like to the alkaline solutions, water, and the like, and swells, there are cases in which the wiring line is disconnected.

An object of the present invention is to attain a configuration of a touch panel in which electrode disconnections resulting from swelling of the insulating film during the manufacturing process can be mitigated.

The touch panel disclosed herein includes: an insulating substrate; first island-shaped electrodes formed on the substrate and arranged along a first direction; second island-shaped electrodes formed on the substrate and arranged along a second direction that intersects with the first direction; a connecting member that connects the first island-shaped electrodes; an insulating film formed so as to cover at least a portion of the connecting member; and a relay electrode connecting the second island-shaped electrodes over the insulating film. A width of the relay electrode in a direction perpendicular to the second direction is less than a width of the insulating film in the direction perpendicular to the second direction in a portion of the relay electrode overlapping the connecting member in a plan view. A pair of edges of the insulating film that are across from each other is covered by the first island-shaped electrodes, the second island-shaped electrodes, or the relay electrode.

According to the present invention, a configuration of a touch panel in which it is possible to mitigate disconnections in the electrodes resulting from swelling of the insulating film during the manufacturing process is attained.

DETAILED DESCRIPTION OF EMBODIMENTS

Figure 1:
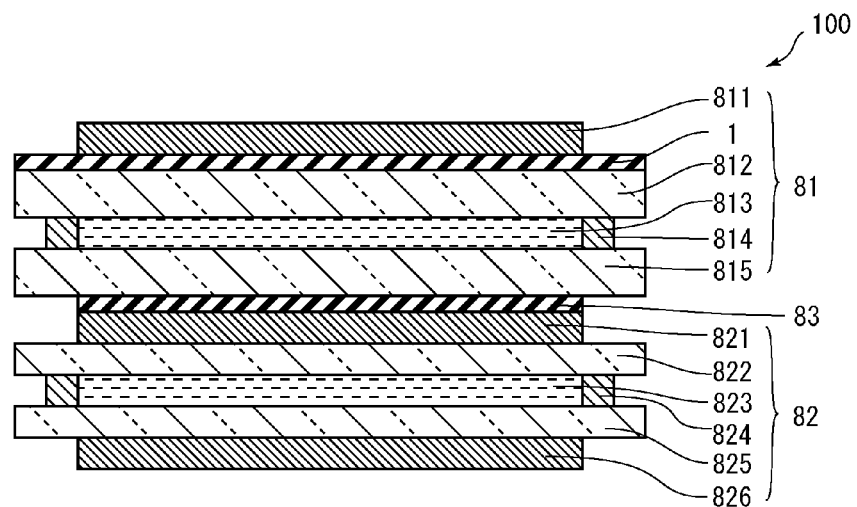
FIG. 1 is a cross-sectional view of a schematic configuration of a display device equipped with a touch panel according to one embodiment of the present invention.

A touch panel according to an embodiment of the present invention includes: an insulating substrate; first island-shaped electrodes formed on the substrate and arranged along a first direction; second island-shaped electrodes formed on the substrate and arranged along a second direction that intersects with the first direction; a connecting member that connects the first island-shaped electrodes; an insulating film formed so as to cover at least a portion of the connecting member; and a relay electrode connecting the second island-shaped electrodes over the insulating film. A width of the relay electrode in a direction perpendicular to the second direction is less than a width of the insulating film in the direction perpendicular to the second direction in a portion of the relay electrode overlapping the connecting member in a plan view. A pair of edges of the insulating film across from each other is covered by the first island-shaped electrodes, the second island-shaped electrodes, or the relay electrode (first configuration).

According to this configuration, in a portion where the relay electrode and the connecting member overlap in a plan view, the width of the relay electrode perpendicular to the second direction is less than the width of the insulating film in the same direction. As a result, the connecting member and the relay electrode do not come into contact, and the first island-shaped electrodes and second island-shaped electrodes are insulated from each other.

Also, according to this configuration, the first island-shaped electrodes, the second island-shaped electrodes, or the relay electrode is formed so as to cover the pair of edges of the insulating film across from each other. As a result, the area of the portions of the insulating film not covered by first island-shaped electrodes, the second island-shaped electrodes, or the relay electrode is reduced.

As a result, in processes after the formation of the insulating film, the area of the insulating film exposed to alkaline solutions, water, and the like is reduced. Thus, it is possible to mitigate swelling in the insulating film. Also, disconnections in the relay electrode resulting from the swelling in the insulating film can be prevented.

In the first configuration, it is possible to have a configuration in which the insulating film is rectangular in a plan view and four corners thereof are covered by the first island-shaped electrodes, the second island-shaped electrodes, or the relay electrode (second configuration).

In the first or second configuration, it is preferable that at least 1 μm each of the pair of edges of the insulating film across from each other be covered (third configuration).

In any one of the first to third configurations, it is preferable that the relay electrode be 10 to 50 nm in thickness (four configuration).

In any one of the first to fourth configurations, it is possible to have a configuration in which the pair of edges of the insulating film across from each other is covered by the relay electrode (fifth configuration).

In any one of the first to fourth configurations, it is possible to have a configuration in which the pair of edges of the insulating film across from each other is covered by the first island-shaped electrodes (sixth configuration).

In any one of the first to fourth configurations, it is possible to have a configuration in which the pair of edges of the insulating film across from each other is covered by the second island-shaped electrodes (seventh configuration).

In the fifth or seventh configuration, it is preferable that a length from an edge face of the insulating film substantially parallel to the second direction to an edge face of the relay electrode substantially parallel to the second direction be 20 μm or less in the portion of the relay electrode overlapping the connecting member in a plan view (eighth configuration).

A display device equipped with a touch panel according to one embodiment of the present invention includes a liquid crystal display device and the touch panel according to any one of the first to eighth configurations (first configuration of a liquid crystal display device equipped with a touch panel).

EMBODIMENTS

Embodiments of the present invention will be described in detail below with reference to the drawings. Portions in the drawings that are the same or similar are assigned the same reference characters and descriptions thereof will not be repeated. For ease of description, drawings referred to below show simplified or schematic configurations, and some of the components are omitted. Components shown in the drawings are not necessarily to scale.

<Overall Configuration>

FIG. 1 is a cross-sectional view showing a schematic configuration of a display device 100 including a touch panel 1 of one embodiment of the present invention. The display device 100 equipped with a touch panel includes a switch liquid crystal panel 81 and a liquid crystal display panel 82. The switch liquid crystal panel 81 and the liquid crystal display panel 82 are bonded to each other by a bonding member 83.

The switch liquid crystal panel 81 includes a polarizing plate 811, the touch panel 1, an active matrix substrate 812, liquid crystal 813, a sealing member 814, and an opposite substrate 815.

The liquid crystal 813 is sandwiched between the active matrix substrate 812 and the opposite substrate 815 disposed opposite thereto, and is sealed in by the sealing member 814 formed in the periphery of the substrates. The active matrix substrate 812 has stripe-shaped transparent electrodes and TFTs (thin film transistors) formed thereon. The opposite substrate 815 has a transparent electrode formed on the entire surface thereof.

The front surface of the active matrix substrate 812 has a touch panel 1 bonded thereto. The touch panel 1, which will be described in detail later, includes an insulating substrate and electrodes formed in a grid pattern. The touch panel 1 detects a position of a finger or the like based on changes in capacitance formed between these electrodes and the finger or the like that is proximal to the touch panel 1. The touch panel 1 is a so-called capacitive touch panel.

The front surface of the touch panel 1 has bonded thereto the polarizing plate 811.

The liquid crystal display panel 82 includes a polarizing plate 821, a color filter substrate 822, liquid crystal 823, a sealing member 824, an active matrix substrate 825, and a polarizing plate 826.

The liquid crystal 823 is sandwiched between the color filter substrate 822 and the active matrix substrate 825 disposed opposite thereto, and is sealed in by the sealing member 824 formed in the periphery of the substrates. The active matrix substrate 825 has pixel electrodes and TFTs formed in a matrix. On the color filter substrate 822, a common electrode formed on the entire surface thereof, and color filters disposed in positions corresponding to the respective pixel electrodes on the active matrix substrate 825 are formed.

The front surface of the color filter substrate 822 has bonded thereto the polarizing plate 821. The rear surface of the active matrix substrate 825 has bonded thereto the polarizing plate 826.

In the liquid crystal display panel 82, the orientation of the liquid crystal 823 is changed over any of the pixel electrodes by controlling the TFTs formed on the active matrix substrate 825. In this manner, the liquid crystal display panel 82 can display any image.

The switch liquid crystal panel 81 can be switched between 2-dimensional display mode and 3-dimensional display mode.

In 2-dimensional display mode, the liquid crystal 813 of the switch liquid crystal panel 81 is oriented evenly by alignment films formed on the active matrix substrate 812 and the opposite substrate 815. As a result, the image displayed in the liquid crystal display panel 82 is displayed as is.

In 3-dimensional display mode, the switch liquid crystal panel 81 controls the TFTs on the active matrix substrate 812 and changes the alignment of the liquid crystal 813 at a set interval. The liquid crystal 813 functions as a lens due to the difference in index of refraction resulting from the change in orientation. Based on this gap, images shot from multiple angles are displayed in a stripe fashion in the liquid crystal display panel 82. As a result, these images are separated by the liquid crystal 813. If the display device 100 with a touch panel is viewed from an optimal position, different images are seen by the left and right eyes. In other words, the display device 100 with a touch panel performs parallax 3-dimensional display during 3-dimensional display mode.

The schematic configuration of the display device 100 with a touch panel according to the present embodiment has been described above. In the display device 100 with a touch panel, the touch panel 1 is a portion of the switch liquid crystal panel 81. The touch panel 1 may alternatively be a portion of the liquid crystal display panel 82. The touch panel 1 may be bonded onto the front surface of the color filter substrate 822 of the liquid crystal display panel 82, for example. Also, a so-called out-cell configuration may be used in which the touch panel 1 is bonded onto the front surface of the polarizing plate 811 or 821.

<Configuration of Touch Panel>

The configuration of the touch panel 1 will be described in detail below.

Embodiment 1

Figure 2A:
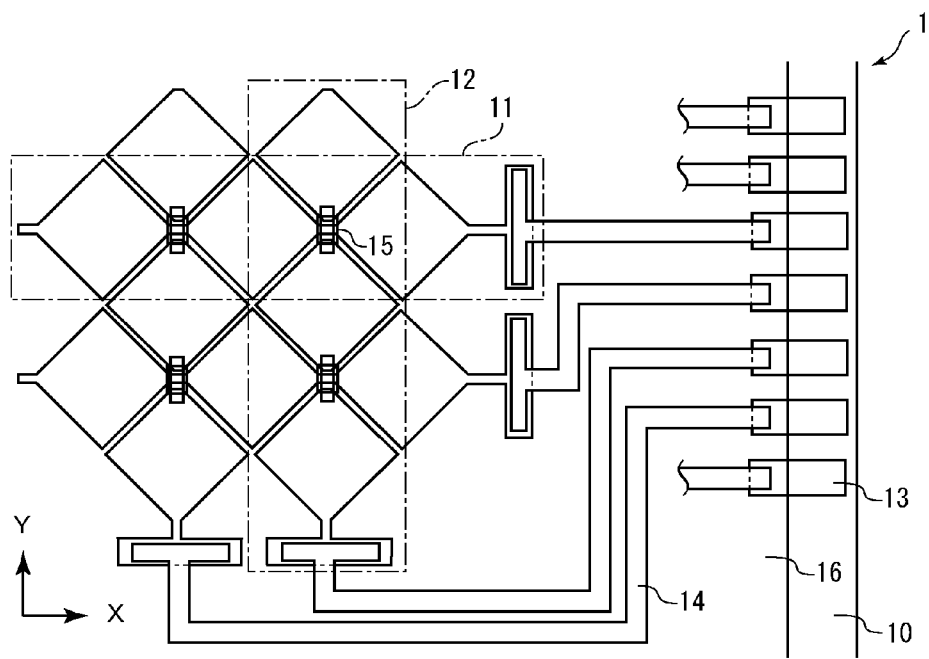
FIG. 2A is a plan view that shows a schematic configuration of a touch panel according to Embodiment 1 of the present invention.

FIG. 2A is a plan view that shows a schematic configuration of a touch panel 1 according to Embodiment 1 of the present invention. The touch panel 1 includes an insulating substrate 10, X electrodes 11 extending in the left-and-right direction (hereinafter, the X direction) in FIG. 2A, Y electrodes 12 extending in the up-and-down direction (hereinafter, the Y direction) in FIG. 2A, terminals 13, wiring lines 14, insulating films 15, and a protective film 16.

As shown in FIG. 2A, the plurality of X electrodes 11 and the plurality of Y electrodes 12 intersect each other perpendicularly and are aligned with a fixed gap therebetween. As will be described later in detail, in portions where the X electrodes 11 and the Y electrodes 12 intersect, insulating films 15 that insulate the X electrodes 11 from the Y electrodes 12 are provided. The respective X electrodes 11 and Y electrodes 12 are electrically connected to the terminals 13 formed in the vicinity of the periphery of the substrate 10 through the wiring lines 14.

The protective film 16 is formed so as to cover the X electrodes 11, the Y electrodes 12, the wiring lines 14, and the insulating films 15. The protective film 16 also covers a portion of the substrate 10 and portions of the terminals 13. As shown in FIG. 2A, portions of the terminals 13 are exposed without being covered by the protective film 16. The terminals 13 are connected to driver circuits and the like through an FPC (flexible printed circuit) or the like.

Figure 2B:
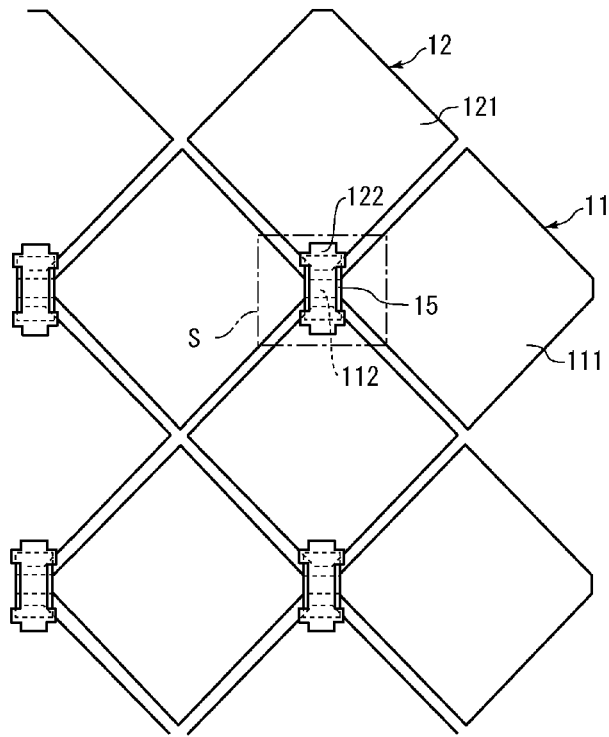
FIG. 2B is a plan view that shows only X electrodes, Y electrodes, and insulating films from the configuration of the touch panel according to Embodiment 1 of the present invention.

FIG. 2B is a plan view in which only the X electrodes 11, the Y electrodes 12, and the insulating films 15 are shown from the configuration of the touch panel 1. As shown in FIG. 2B, the X electrodes 11 include a plurality of island-shaped electrodes 111 and connecting members 112 connecting adjacent island-shaped electrodes 111. The Y electrodes 12 include a plurality of island-shaped electrodes 121 and relay electrodes 122 that connect adjacent island-shaped electrodes 121.

The insulating films 15 are formed so as to cover the connecting members 112 of the X electrodes 11. The relay electrodes 122 of the Y electrodes 12 connect the island-shaped electrodes 121 to each other over the insulating film 15. The X electrodes 11 and the Y electrodes 12 are insulated from each other by this layered configuration.

Figure 3:
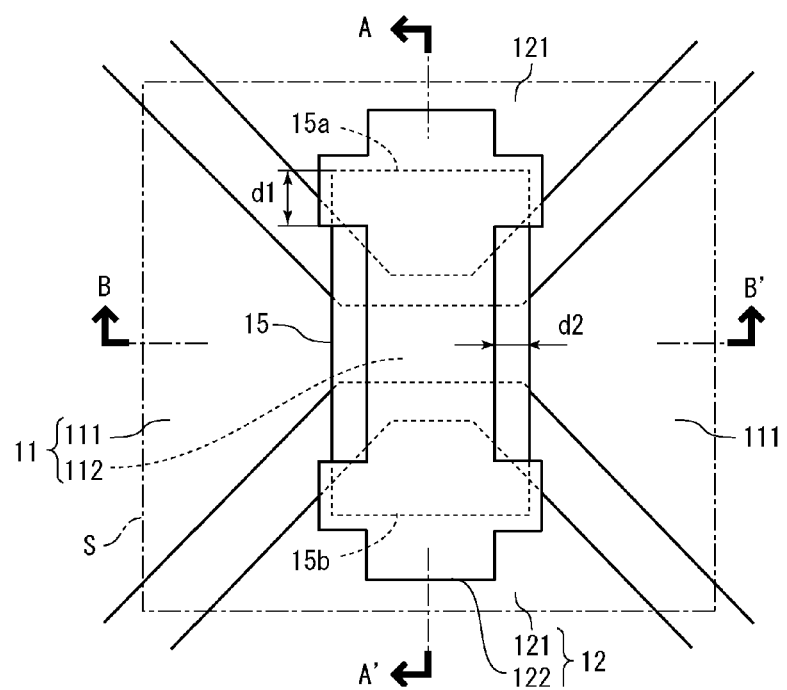
FIG. 3 shows a magnified view of a portion where an X electrode and a Y electrode intersect (rectangular region S in FIG. 2B).
Figure 4A:
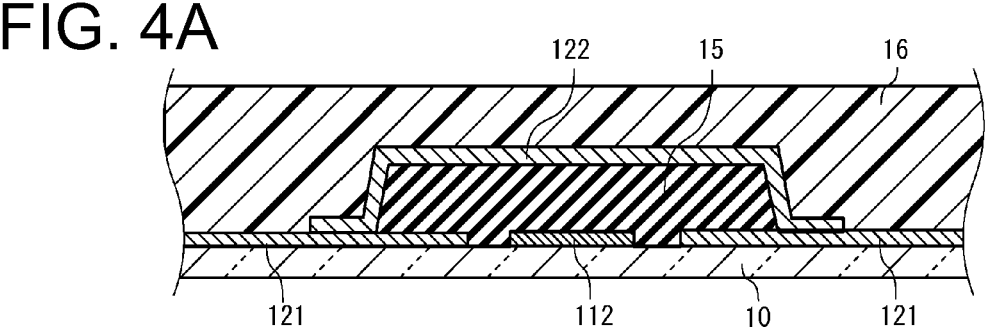
FIG. 4A is a cross-sectional view of FIG. 3 along the line A-A'.
Figure 4B:
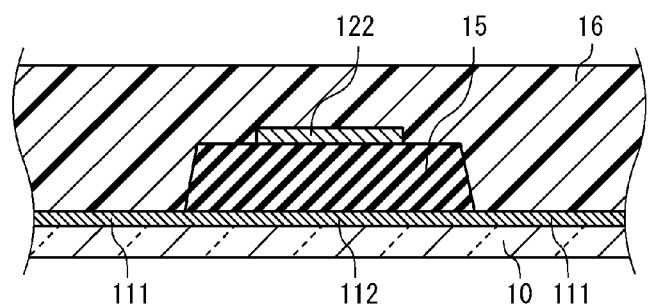
FIG. 4B is a cross-sectional view of FIG. 3 along the line B-B'.

FIG. 3 shows a magnified view of a portion where the X electrode 11 and the Y electrode 12 intersect (rectangular region S in FIG. 2B). FIG. 4A is a cross-sectional view of FIG. 3 along the line A-A'. FIG. 4B is a cross-sectional view of FIG. 3 along the line B-B'.

As shown in FIG. 3, the insulating film 15 has a rectangular shape in a plan view. The relay electrode 122 is formed so as to cover a pair of edges 15a and 15b of the insulating film 15 that are across from each other.

In portions where the relay electrode 122 and the connecting member 112 overlap in a plan view, the width of the relay electrode 122 in the left-and-right direction in FIG. 3 (width perpendicular to the Y direction) is narrower than the width of the insulating film 15 in the same direction. As a result, the X electrode 11 and the relay electrode 122 are not in contact.

On the other hand, it is preferable that the area of the portion of the insulating film 15 not covered by the relay electrode 122 be as small as possible. That is, it is preferable that a length d1 in FIG. 3 be as large as possible and that a length d2 in FIG. 3 be as small as possible to the extent that the X electrode 11 and the Y electrode 12 do not come into contact.

It is preferable that the length d1, which is where the insulating film 15 is covered from the edge 15a by the relay electrode 122, be at least 1 μm. This is because, if the length d1 is less than 1 μm, then there are cases in which moisture or the like enters the edge 15a of the insulating film 15, which causes swelling and results in disconnections in the relay electrode 122. It is more preferable that the length d1 be at least 3 μm, and even more preferably, at least 5 μm. This similarly applies to the length of the area of the insulating film 15 covered from the edge 15b.

It is preferable that the length d2 between an edge face of the insulating film 15 parallel to the up-and-down direction (Y direction) in FIG. 3 and an edge face of the relay electrode 122 parallel to the same direction be at most 20 μm. If the length d2 exceeds 20 μm, then there are cases in which moisture and the like enters the insulating film 15, which causes swelling and results in disconnections in the relay electrode 122. It is more preferable that the length d2 be at most 10 μm, and even more preferably, at most 5 μm.

As shown in FIGS. 4A and 4B, it is preferable that the insulating film 15 have a tapered protrusion towards the direction opposite to the substrate 10 in a cross-sectional view. As will be described later, the relay electrode 122 is formed by CVD (chemical vapor deposition) or the like of a transparent electrode film. If the edge face of the insulating film 15 is vertical, then there are cases that the step would result in an inability to form a continuous transparent electrode film. By providing the insulating film 15 with a taper, it is possible to have a stable connection between the island-shaped electrodes 121 and the relay electrode 122.

As shown in FIGS. 3 and 4A, it is preferable that the insulating film 15 be formed so as to cover the connecting member 112 of the X electrode 11 and portions of the island-shaped electrodes 121 of the Y electrode 12. The island-shaped electrodes 121 are formed by CVD or the like of a transparent electrode film, as in the relay electrode 122. The transparent electrode film is patterned by photolithography or the like. At this time, the cross-sectional face of the island-shaped electrode 121 has a reverse tapered shape, which is not desirable. As a result, if there is a gap between the insulating film 15 and the island-shaped electrode 121, then there are cases in which it is not possible to form a continuous transparent electrode film in the boundary portion thereof with the island-shaped electrode 121. It is possible to have a stable connection between the island-shaped electrodes 121 and the relay electrode 122 by forming the insulating film 15 so as to also cover portions of the island-shaped electrodes 121.

<Manufacturing Method for Touch Panel 1>

A manufacturing method for the touch panel 1 will be described below with reference to FIGS. 5A to 5D. FIGS. 5A to 5D are cross-sectional views along the line A-A' in FIG. 3.

First the insulating substrate 10 is prepared. The substrate 10 is a glass substrate, for example.

An even transparent electrode film is formed on the entire surface of the insulating substrate 10 by sputtering or CVD. The transparent electrode film is ITO (indium tin oxide) or IZO (indium zinc oxide), for example. There is no special limitation on the thickness of the transparent electrode film, but it is 10 nm to 30 nm, for example.

The transparent electrode film formed over the entire surface of the substrate 10 is patterned by photolithography. The island-shaped electrodes 111 (not shown in FIG. 5A) of the X electrodes 11, the connecting members 112, and the island-shaped electrodes 121 of the Y electrodes 12 are formed by patterning (refer to FIG. 5A). More specifically, a mask made of photoresist is formed in portions where the island-shaped electrodes 111, the connecting members 112, and the island-shaped electrodes 121 are to be formed. The remaining portions are removed by etching.

At this time, the terminals 13 (refer to FIG. 2A) may be formed at the same time. In other words, photoresist may also be formed in portions where the terminals 13 are to be formed. The terminals 13 may be formed in a different step from when the island-shaped electrodes 111, the connecting members 112, and the island-shaped electrodes 121 are formed. In this case, the terminals 13 may be formed from a different material from the island-shaped electrodes 111, the connecting members 112, and the island-shaped electrodes 121.

Next, a metal film is formed over the entire surface of the substrate 10 by sputtering or vapor deposition. The metal film is a low-resistance metal film such as Al, for example. It is preferable that a structure be used in which a plurality of types of metal films are layered in order to improve the adhesion of the lower layer and upper layer, and to improve resistance to corrosion. A metal film in which MoNb, Al, and MoNb are layered in this order can be used, for example. There is no special limitation on the thickness of the metal film, but it is 0.3 μm to 1.0 μm, for example.

The metal film formed over the entire surface of the substrate 10 is patterned by photolithography. By patterning, the wiring lines 14 (refer to FIG. 2A) that connect the X electrodes 11, the Y electrodes 12, and the terminals 13 are formed. More specifically, masks made of photoresist are formed over portions where the wiring lines 14 are to be formed. The remaining portions are removed by etching.

Next, the insulating films 15 are formed. A photoresist including an acrylic resin, a novolac resin, or the like can be used for the insulating film 15, for example.

Photoresist is evenly coated onto the entire surface of the substrate 10 by a spin coater or a slit coater. There is no special limitation on the thickness to which the photoresist is to be coated, but it is 1.5 to 3.0 μm.

The photoresist may be of a positive type in which the solubility thereof in developer decreases upon exposure to light, or a negative type in which the solubility thereof in developer increases upon exposure to light. After the coating of the photoresist, prebaking, exposure, developing, postbaking, and the like are performed, thus forming the insulating films 15 in prescribed locations (refer to FIG. 5B).

As previously mentioned, it is preferable that the insulating films 15 have tapered shapes that protrude towards the direction opposite to the substrate 10. Such a tapered shape can be formed by using photomasks of differing light transmittance gradations to perform exposure. There is no special limitation on the taper angle but it is 30 to 80°, for example.

Next, the relay electrodes 122 are formed. A transparent electrode film made of ITO, IZO, or the like is formed evenly over the entire surface of the substrate 10 by sputtering or CVD. Then, the relay electrodes 122 are formed by patterning by photolithography (refer to FIG. 4C). More specifically, masks made of photoresist are formed over portions where the relay electrodes 122 are to be formed. The remaining portions are removed by etching.

If the relay electrode 122 is too thick, then it is visible with ease by a user, which would decrease the display quality of the touch panel 1. It is preferable that the thickness of the relay electrode 122 be at most 50 nm. It is even more preferable that the thickness of the relay electrode 122 be at most 45 nm.

On the other hand, if the relay electrode 122 is too thin, then there is a possibility of disconnection when the insulating film 15 swells or the like. It is preferable that the thickness of the relay electrode 122 be at least 10 nm. It is more preferable that the thickness of the relay electrode 122 be at least 20 nm, and even more preferably at least 35 nm.

Figure 5A:
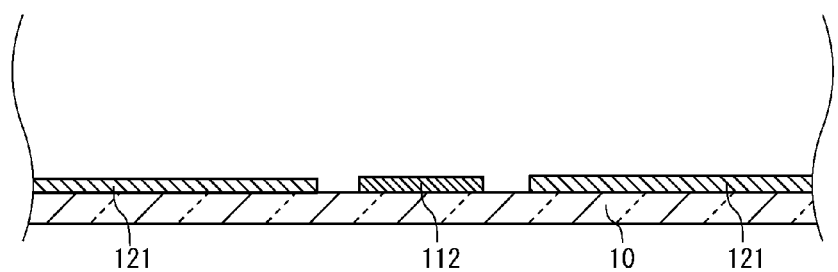
FIG. 5A is a cross-sectional view for describing a manufacturing method for the touch panel according to Embodiment 1 of the present invention.
Figure 5B:
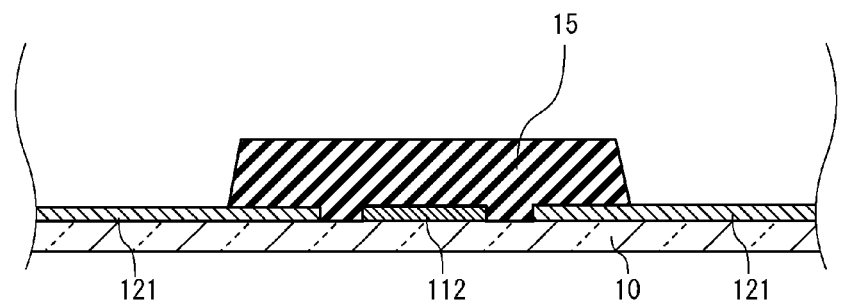
FIG. 5B is a cross-sectional view for describing a manufacturing method for the touch panel according to Embodiment 1 of the present invention.
Figure 5C:
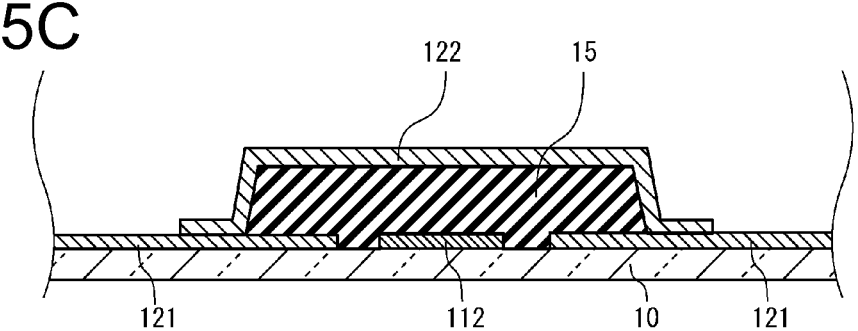
FIG. 5C is a cross-sectional view for describing a manufacturing method for the touch panel according to Embodiment 1 of the present invention.
Figure 5D:
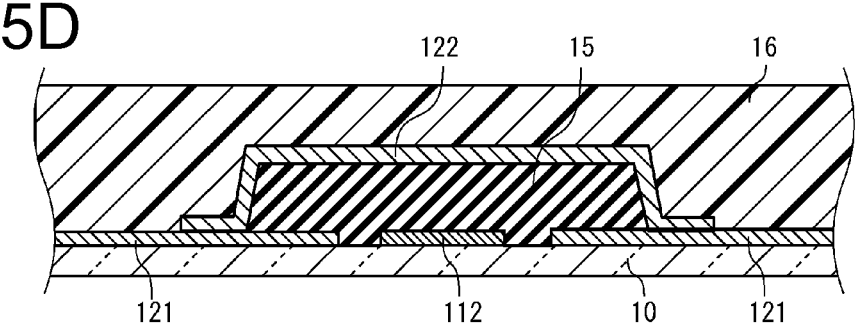
FIG. 5D is a cross-sectional view for describing a manufacturing method for the touch panel according to Embodiment 1 of the present invention.

Lastly, the protective film 16 is evenly coated by a spin coater or slit coater (refer to FIG. 5D). At this time, a metal mask or the like is used such that the protective film 16 does not cover portions of the terminals 13. The protective film 16 is an acrylic resin, for example. There is no special limitation on the thickness of the protective film 16, but it is 2 μm to 3 μm, for example.

The configuration of the touch panel 1 and the manufacturing method according to Embodiment 1 of the present invention have been described above.

According to the configuration of the touch panel 1 of the present embodiment, the relay electrode 122 is formed so as to cover a pair of edges 15a and 15b of the insulating film 15 that are across from each other. As a result, the area of the portion of the insulating film 15 not covered by the relay electrode 122 is smaller.

As a result, in the process after the formation of the insulating film 15, the area of the insulating film 15 exposed to alkaline solutions, water, and the like is reduced. Thus, swelling of the insulating film 15 can be mitigated. Also, disconnection in the relay electrode 122 due to swelling in the insulating film 15 can be prevented.

Comparison Example

Figure 6A:
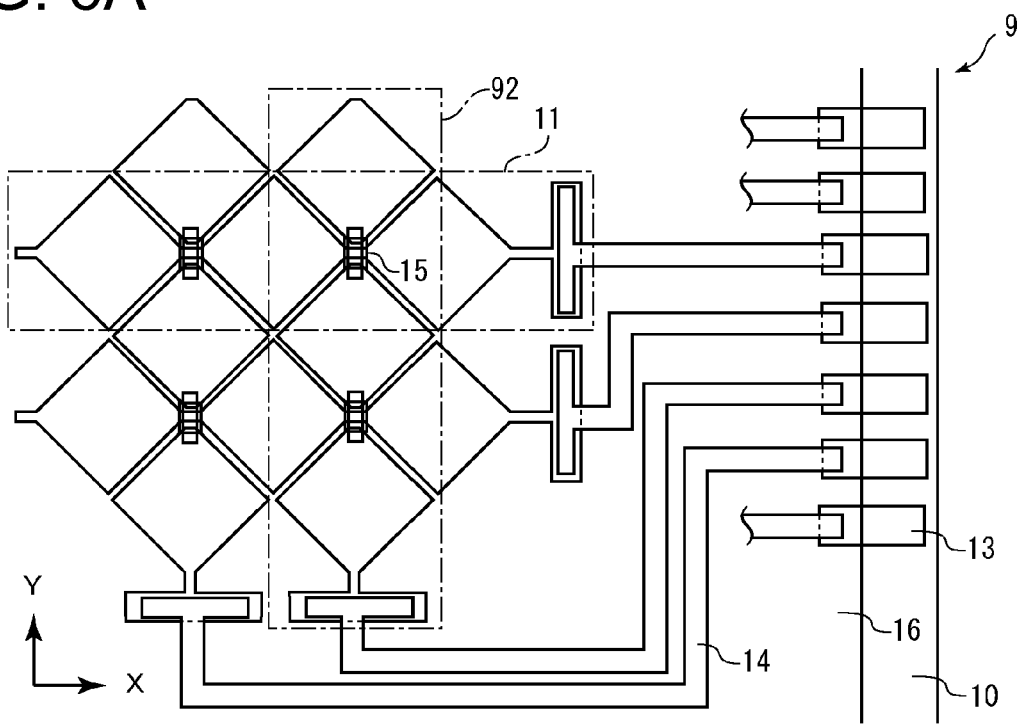
FIG. 6A is a plan view that shows a schematic configuration of a touch panel according to a comparison example.

Here, in order to explain the effect of the touch panel 1 of the present embodiment, a hypothetical comparison example will be described. FIG. 6A is a plan view that shows a schematic configuration of a touch panel 9 according to a comparison example. The touch panel 9 includes an insulating substrate 10, X electrodes 11, Y electrodes 92, terminals 13, wiring lines 14, insulating films 15, and a protective film 16. That is, the touch panel 9 has a different configuration for the Y electrodes compared to the touch panel 1.

Figure 6B:
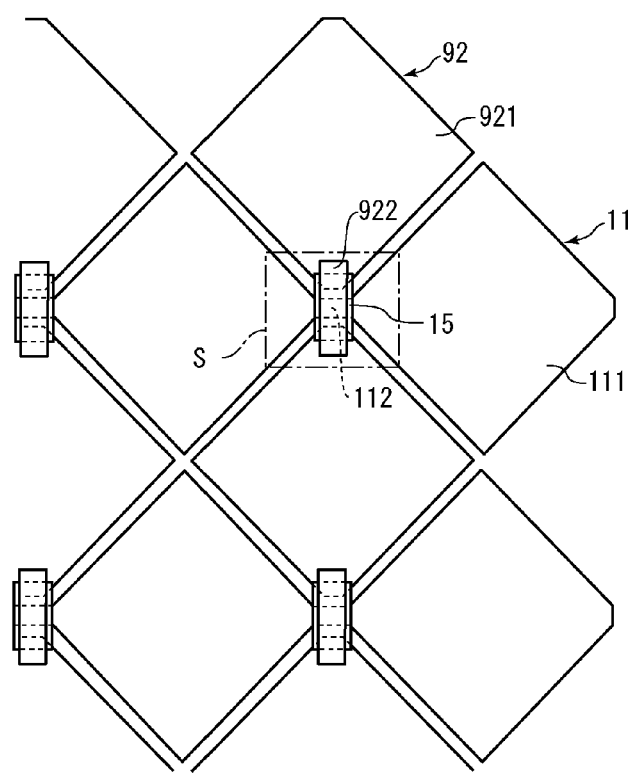
FIG. 6B is a plan view that shows only X electrodes, Y electrodes, and insulating films from the configuration of the touch panel according to the comparison example.

FIG. 6B is a plan view in which only the X electrodes 11, the Y electrodes 92, and the insulating films 15 are shown from the configuration of the touch panel 9. As shown in FIG. 6B, the Y electrodes 92 include a plurality of island-shaped electrodes 921 and relay electrodes 922 connecting adjacent island-shaped electrodes 921. The insulating films 15 are formed so as to cover the connecting members 112 of the X electrodes 11, like the touch panel 1. The relay electrodes 922 of the Y electrodes 92 connect the island-shaped electrodes 921 to each other over the insulating film 15. The X electrodes 11 and the Y electrodes 92 are insulated from each other by this layered configuration.

Figure 7:
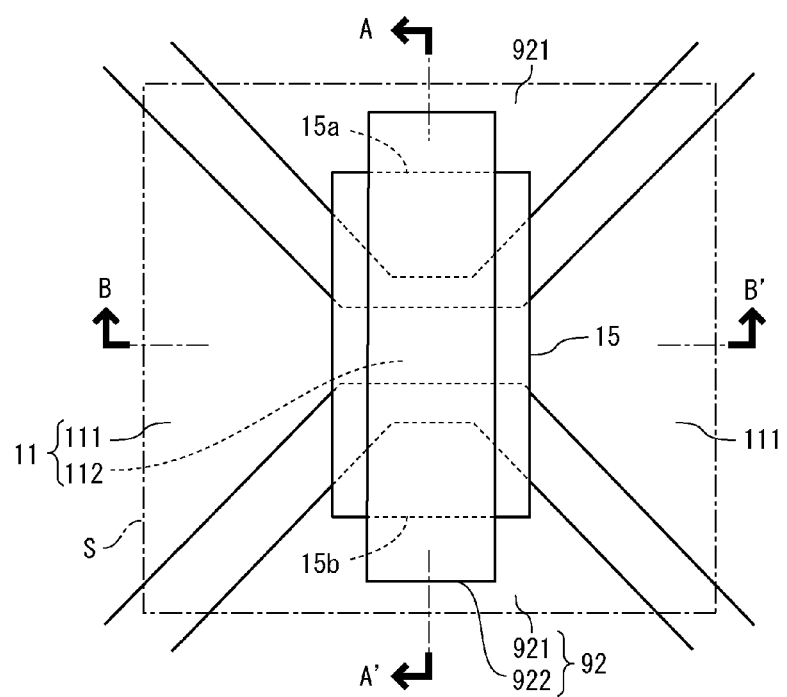
FIG. 7 shows a magnified view of a portion where an X electrode and a Y electrode intersect (rectangular region S in FIG. 6B).
Figure 8A:
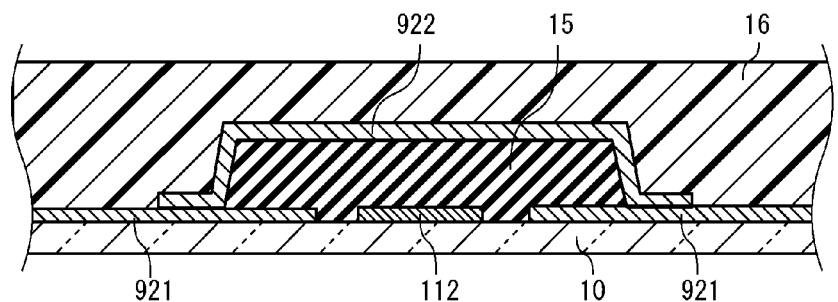
FIG. 8A is a cross-sectional view of FIG. 7 along the line A-A'.
Figure 8B:
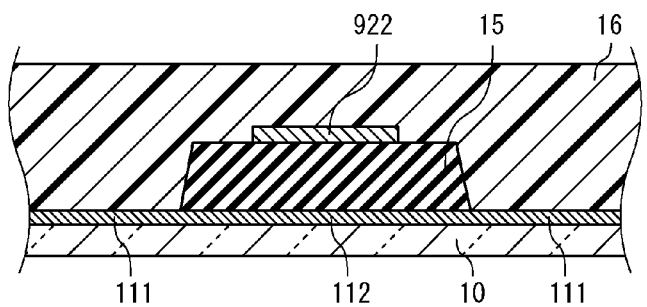
FIG. 8B is a cross-sectional view of FIG. 7 along the line B-B'.

FIG. 7 shows a magnified view of a portion where the X electrode 11 and the Y electrode 92 intersect (rectangular region S in FIG. 6B). FIG. 8A is a cross-sectional view of FIG. 7 along the line A-A'. FIG. 8B is a cross-sectional view of FIG. 7 along the line B-B'.

As shown in FIG. 7, unlike the touch panel 1, the relay electrode 922 covers only portions of the edges 15a and 15b of the insulating film 15. Portions of the insulating film 15 not covered by the relay electrode 922 are exposed to alkaline solutions, water, and the like in the processes that happen after the formation of the insulating film 15. These portions of the insulating film 15 sometimes swell.

Figure 9:
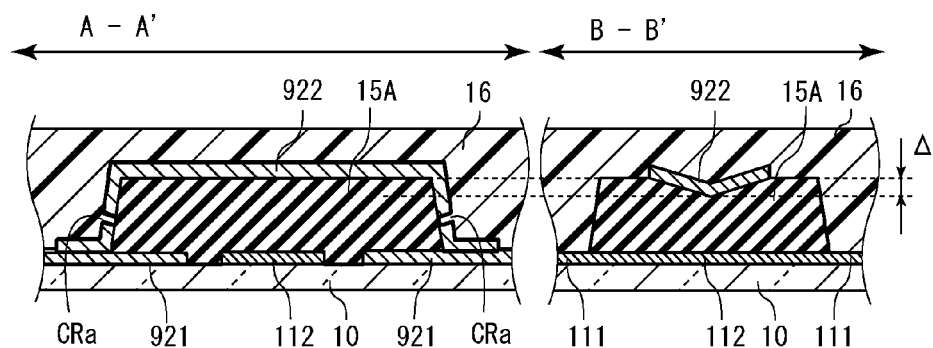
FIG. 9 shows cross-sectional views of FIG. 7 along the line A-A' and the line B-B' in a situation in which the insulating film has swelled.

FIG. 9 shows cross-sectional views of FIG. 7 along the line A-A' and the line B-B', and show a situation in which the insulating film 15 swells to become an insulating film 15A. As shown in FIG. 9, if the insulating film 15 swells and becomes the insulating film 15A, the thickness thereof increases by Δ. As a result, there is a possibility that cracks CRa form in the relay electrode 922 formed on the insulating film 15A over the tapered portions of the insulating film 15A, causing disconnections.

Figure 10A:
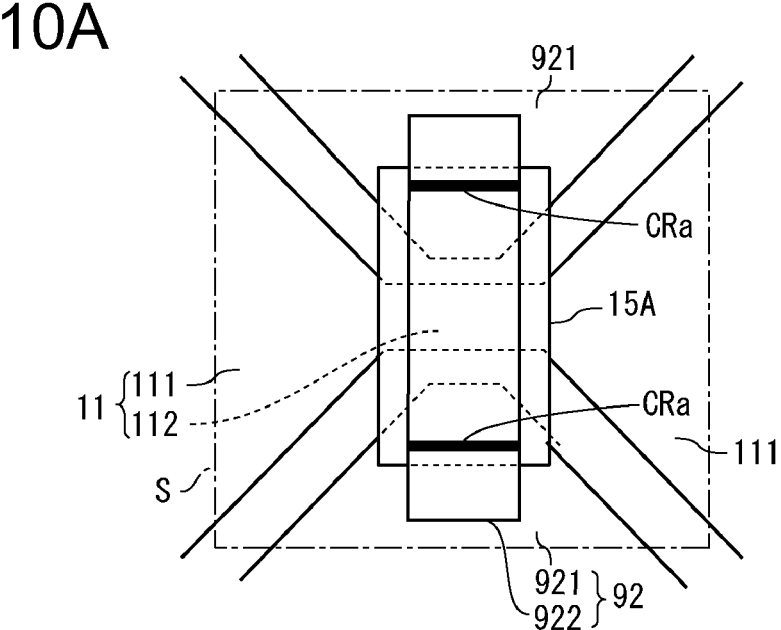
FIG. 10A is a plan view that shows only X electrodes, Y electrodes, and insulating films from the configuration of the touch panel of the comparison example in a situation in which the insulating film has swelled.
Figure 10B:
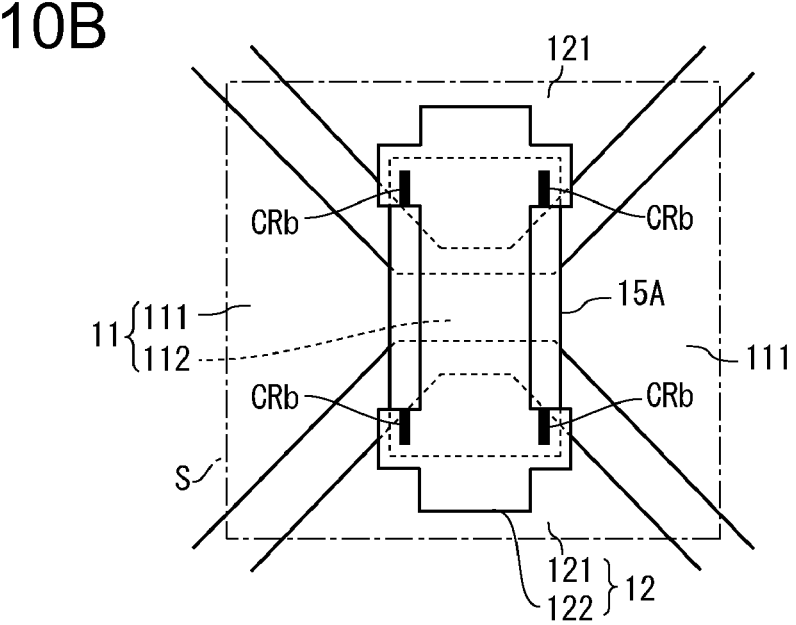
FIG. 10B is a plan view that shows only X electrodes, Y electrodes, and insulating films from the configuration of the touch panel according to Embodiment 1 of the present invention in a situation in which the insulating film has swelled.

FIG. 10A is a plan view showing only the X electrode 11, the Y electrode 92, and the insulating film 15 from the configuration of the touch panel 9, and shows a situation in which the insulating film 15 swells and becomes the insulating film 15A. FIG. 10B is a plan view showing only the X electrode 11, the Y electrode 12, and the insulating film 15 from the configuration of the touch panel 1, and shows a situation in which the insulating film 15 swells and becomes the insulating film 15A.

In the case of the touch panel 9, as described above, there are cases in which the cracks CRa form over the tapered portions of the insulating film 15. As shown in FIG. 10A, the cracks CRa are perpendicular to the direction in which the adjacent island-shaped electrodes 921 are connected, which results in the possibility of the relay electrode 922 having a disconnection.

On the other hand, in the touch panel 1 of the present embodiment, the amount of swelling is small. Also, even if the insulating film 15 swells to become the insulating film 15A, as shown in FIG. 10b, cracks CRb are parallel to the direction in which the adjacent island-shaped electrodes 121 are connected. Thus, the relay electrodes 122 have no disconnections.

Embodiment 2

The display device 100 equipped with a touch panel may include a touch panel 2 or 3 to be described below instead of the touch panel 1.

Figure 11A:
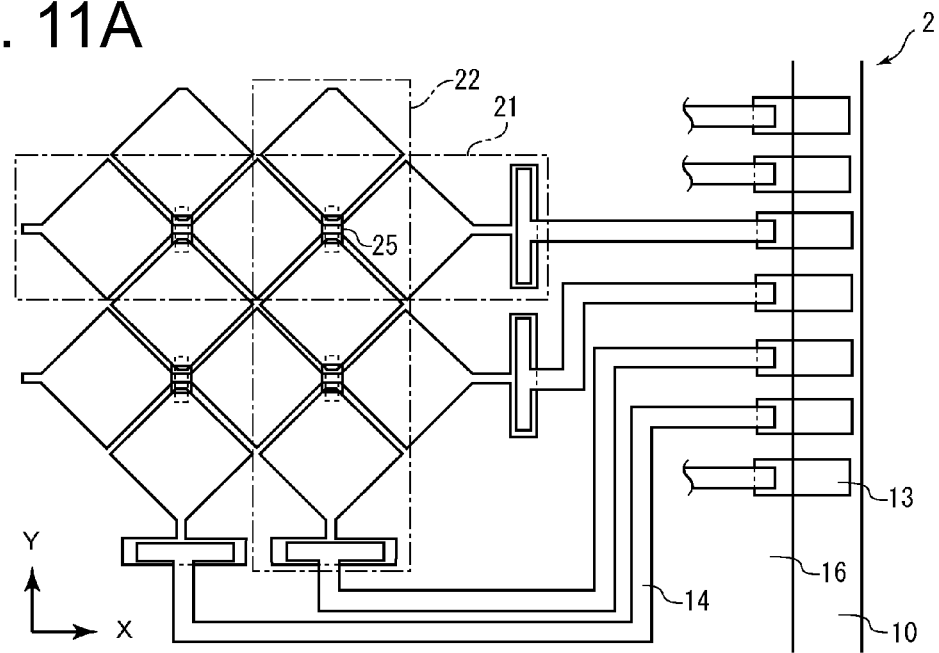
FIG. 11A is a plan view that shows a schematic configuration of a touch panel according to Embodiment 2 of the present invention.

FIG. 11A is a plan view that shows a schematic configuration of a touch panel 2 according to Embodiment 2 of the present invention. The touch panel 2 includes an insulating substrate 10, X electrodes 21, Y electrodes 22, terminals 13, wiring lines 14, insulating films 25, and a protective film 16. That is, in the touch panel 2, the configuration of the X electrodes, the Y electrodes, and the insulating films are different from those of the touch panel 1.

Figure 11B:
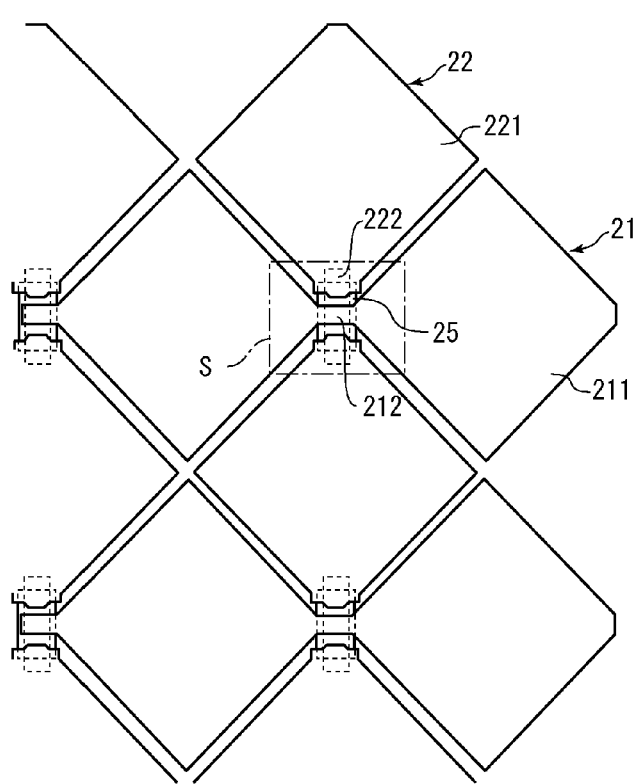
FIG. 11B is a plan view that shows only X electrodes, Y electrodes, and insulating films from the configuration of the touch panel according to Embodiment 2 of the present invention.

FIG. 11B is a plan view in which only the X electrodes 21, the Y electrodes 22, and the insulating films 25 are shown from the configuration of the touch panel 2. As shown in FIG.

11B, the X electrodes 21 include a plurality of island-shaped electrodes 211, and relay electrodes 212 that connect adjacent island-shaped electrodes 211. The Y electrodes 22 include a plurality of island-shaped electrodes 221, and connecting members 222 that connect adjacent island-shaped electrodes 221. The insulating films 25 are formed so as to cover portions of the connecting members 222 of the Y electrodes 22. The relay electrodes 212 of the X electrodes 21 connect the island-shaped electrodes 211 to each other over the insulating film 25. The X electrodes 21 and the Y electrodes 22 are insulated from each other by this layered configuration.

Figure 12:
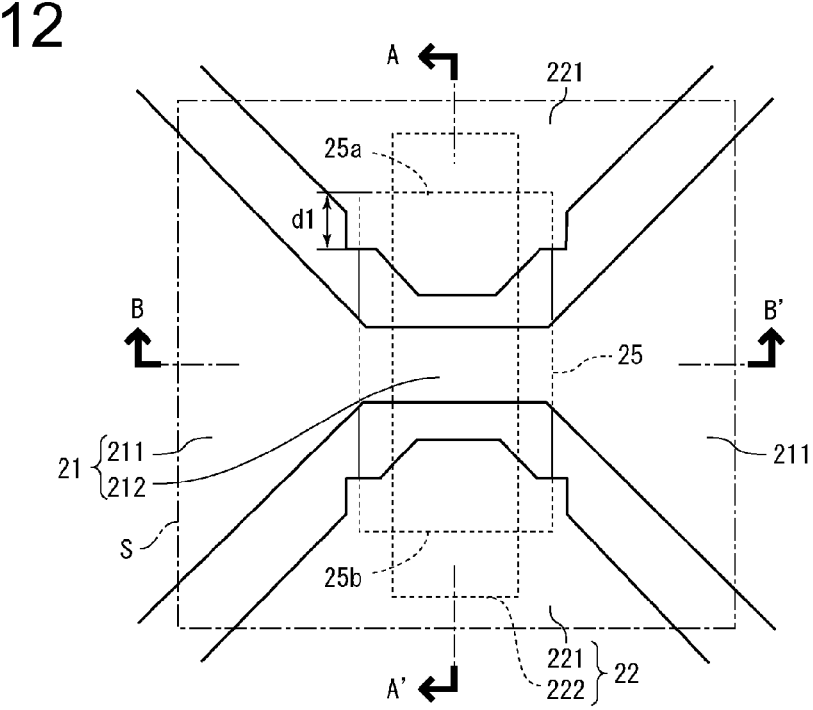
FIG. 12 shows a magnified view of a portion where an X electrode and a Y electrode intersect (rectangular region S in FIG. 11B).
Figure 13A:
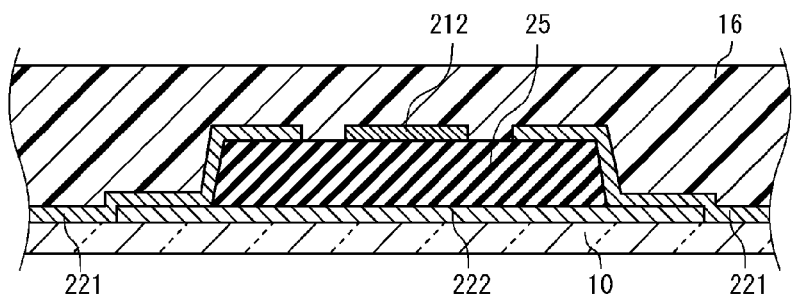
FIG. 13A is a cross-sectional view of FIG. 12 along the line A-A'.
Figure 13B:
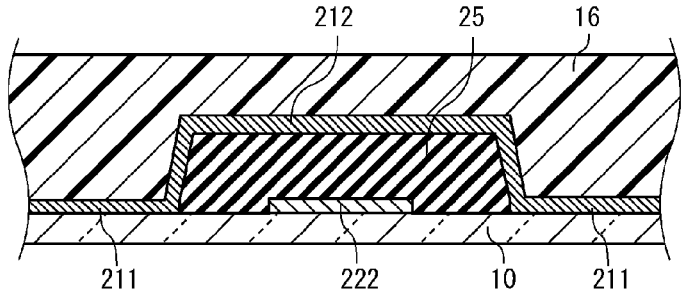
FIG. 13B is a cross-sectional view of FIG. 12 along the line B-B'.

FIG. 12 shows a magnified view of a portion where the X electrode 21 and the Y electrode 22 intersect (rectangular region S in FIG. 11B). FIG. 13A is a cross-sectional view of FIG. 12 along the line A-A'. FIG. 13B is a cross-sectional view of FIG. 12 along the line B-B'.

As shown in FIG. 12, the insulating film 25 has a rectangular shape in a plan view. The island-shaped electrodes 221 of the Y electrode 22 are formed so as to cover a pair of edges 25a and 25b of the insulating film 25 that are across from each other.

In portions where the relay electrode 212 and the connecting member 222 overlap in a plan view, the width of the relay electrode 212 in the up-and-down direction in FIG. 12 (width perpendicular to the X direction) is narrower than the width of the insulating film 25 in the same direction. As a result, the Y electrode 22 and the relay electrode 212 do not contact each other.

On the other hand, it is preferable that the area of the portion of the insulating film 25 covered by neither the island-shaped electrodes 221 nor the relay electrode 212 be as small as possible. In other words, it is preferable that a length d1 in FIG. 12 be as large as possible to the extent that the X electrodes 21 and the Y electrodes 22 do not come into contact.

It is preferable that the length d1, which is where the insulating film 25 is covered from the edge 25a by the island-shaped electrode 221, be at least 1 μm. If the length d1 is less than 1 μm, then there are cases in which moisture or the like enters the edge 25a of the insulating film 25, which causes swelling and results in disconnections in the relay electrode 212. It is more preferable that the length d1 be at least 3 μm, and even more preferably, at least 5 μm. This similarly applies to the length of the area of the insulating film 25 covered from the edge 25b.

It is preferable that the insulating film 25 have a tapered protrusion towards the direction opposite to the substrate 10 in a cross-sectional view. This is for a similar reason to the insulating film 15.

<Manufacturing Method for Touch Panel 2>

A manufacturing method for the touch panel 2 will be described below with reference to FIGS. 14A to 14D. FIGS. 14A to 14D are cross-sectional views along the line A-A' in FIG. 12. Descriptions of portions similar to those of the touch panel 1 will be omitted as appropriate.

An even transparent electrode film is formed on the entire surface of the insulating substrate 10 by sputtering or CVD. The connecting members 222 of the Y electrodes 22 are formed by patterning by photolithography (refer to FIG. 14A).

The terminals 13 (refer to FIG. 11A) may be formed simultaneously with the connecting members 222 or in a different step.

Next, a metal film is formed over the entire surface of the substrate 10 by sputtering or vapor deposition. The wiring lines 14 (refer to FIG. 11A) are formed by patterning by photolithography to connect the terminals 13 to the areas where the X electrodes 21 and the Y electrodes 22 are to be formed.

Photoresist is evenly coated onto the entire surface of the substrate 10 by a spin coater or a slit coater. After the coating of the photoresist, prebaking, exposure, developing, postbaking, and the like are performed, thus forming the insulating films 25 in prescribed locations (refer to FIG. 14B).

A transparent electrode film made of ITO, IZO, or the like is formed evenly over the entire surface of the substrate 10 by sputtering or CVD. Then, the island-shaped electrodes 211 of the X electrodes 21 (not shown in FIG. 14C), the relay electrodes 212, and the island-shaped electrodes 221 of the Y electrodes 22 are formed (refer to FIG. 14C) by patterning by photolithography.

If the relay electrodes 212 are too thick, then similar to the touch panel 1, they can be seen with ease by a user, and if they are too thin, then there is a possibility of disconnection due to swelling or the like in the insulating film 25. The upper limit of the thickness of the relay electrodes 212 is preferably 50 nm, and more preferably 45 nm. The lower limit of the thickness of the relay electrodes 212 is preferably 10 nm, more preferably 20 nm, and even more preferably 35 nm.

Figure 14A:
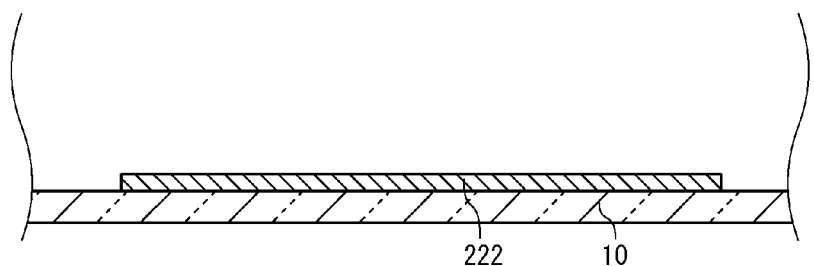
FIG. 14A is a cross-sectional view for describing a manufacturing method for the touch panel according to Embodiment 2 of the present invention.
Figure 14B:
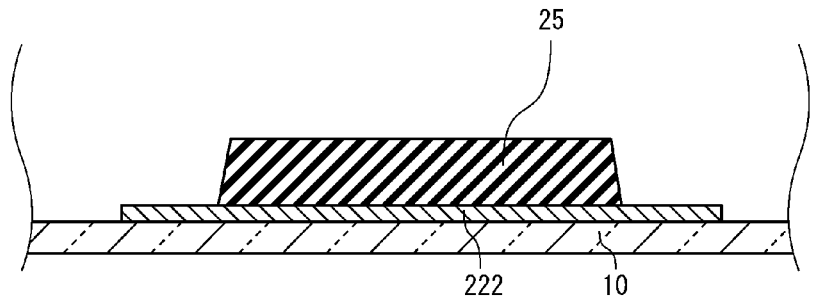
FIG. 14B is a cross-sectional view for describing a manufacturing method for the touch panel according to Embodiment 2 of the present invention.
Figure 14C:
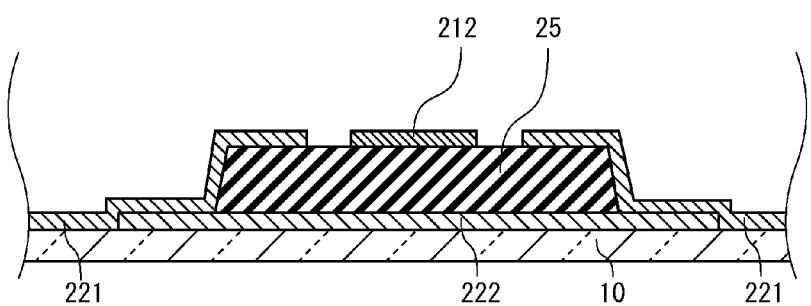
FIG. 14C is a cross-sectional view for describing a manufacturing method for the touch panel according to Embodiment 2 of the present invention.
Figure 14D:
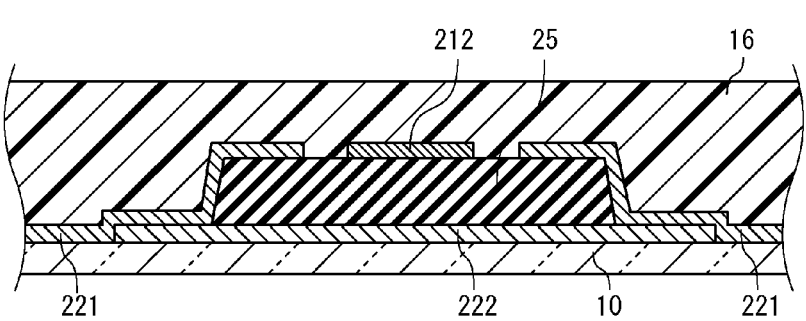
FIG. 14D is a cross-sectional view for describing a manufacturing method for the touch panel according to Embodiment 2 of the present invention.

Lastly, the protective film 16 is evenly coated by a spin coater or slit coater (refer to FIG. 14D). At this time, a metal mask or the like is used such that the protective film 16 does not cover portions of the terminals 13.

The configuration of the touch panel 2 and the manufacturing method according to Embodiment 2 of the present invention have been described above.

According to the configuration of the touch panel 2 of the present embodiment, the island-shaped electrodes 221 of the Y electrodes 22 are covered by the pair of edges 25a and 25b of the insulating film 25 that are across from each other. As a result, the area of the portion of the insulating film 25 covered by neither the island-shaped electrodes 221 nor the relay electrode 212 is smaller.

As a result, in the process after the formation of the insulating film 25, the area of the insulating film 25 exposed to an alkaline solution, water, and the like is reduced. Thus, swelling of the insulating film 25 can be mitigated. Also, disconnection in the relay electrode 212 due to swelling in the insulating film 25 can be prevented.

Embodiment 3

Figure 15A:
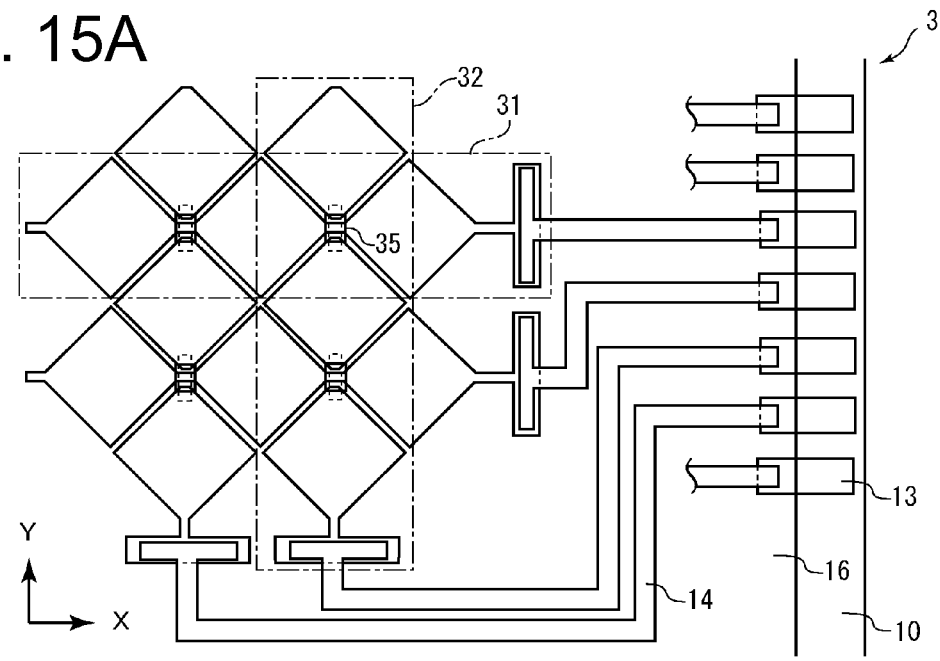
FIG. 15A is a plan view that shows a schematic configuration of a touch panel according to Embodiment 3 of the present invention.

FIG. 15A is a plan view that shows a schematic configuration of a touch panel 3 according to Embodiment 3 of the present invention. The touch panel 3 includes an insulating substrate 10, X electrodes 31, Y electrodes 32, terminals 13, wiring lines 14, insulating films 35, and a protective film 16. That is, in the touch panel 3, the configuration of the X electrodes, the Y electrodes, and the insulating films are different from those of the touch panel 1.

Figure 15B:
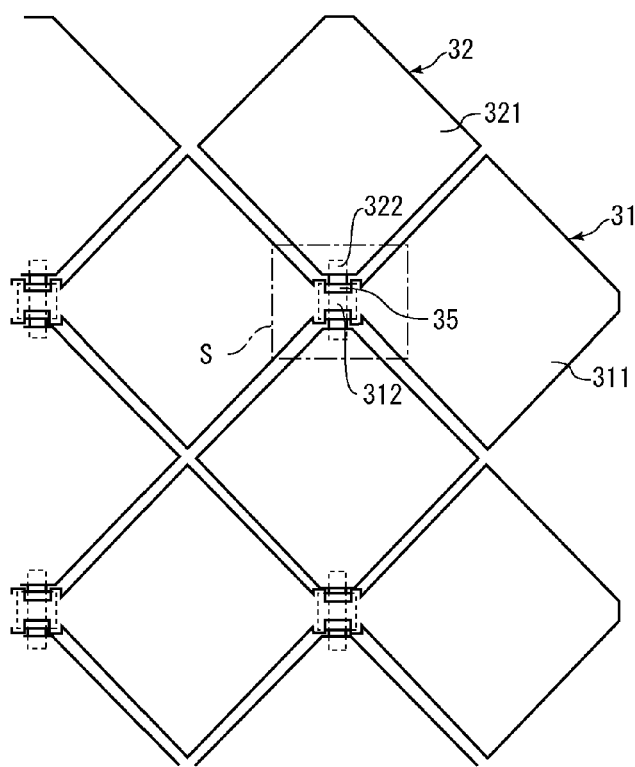
FIG. 15B is a plan view that shows only X electrodes, Y electrodes, and insulating films from the configuration of the touch panel according to Embodiment 3 of the present invention.

FIG. 15B is a plan view in which only the X electrodes 31, the Y electrodes 32, and the insulating films 35 are shown from the configuration of the touch panel 3. As shown in FIG. 15B, the X electrodes 31 include a plurality of island-shaped electrodes 311, and relay electrodes 312 that connect adjacent island-shaped electrodes 311. The Y electrodes 32 include a plurality of island-shaped electrodes 321, and connecting members 322 that connect adjacent island-shaped electrodes 321. The insulating films 35 are formed so as to cover portions of the connecting members 322 of the Y electrodes 32. The relay electrodes 312 of the X electrodes 31 connect the island-shaped electrodes 311 to each other over the insulating film 35. The X electrodes 31 and the Y electrodes 32 are insulated from each other by this layered configuration.

Figure 16:
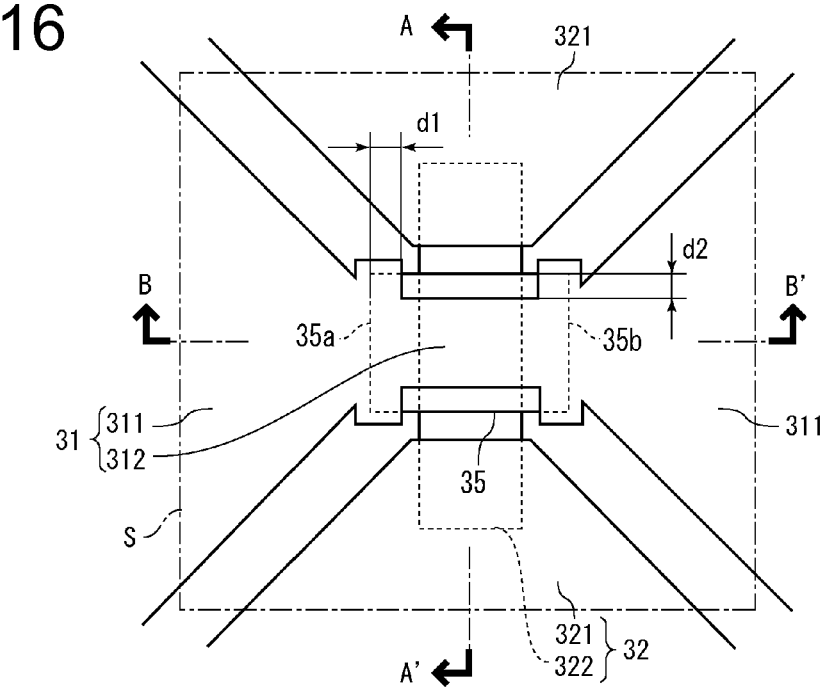
FIG. 16 shows a magnified view of a portion where an X electrode and a Y electrode intersect (rectangular region S in FIG. 15B).
Figure 17A:
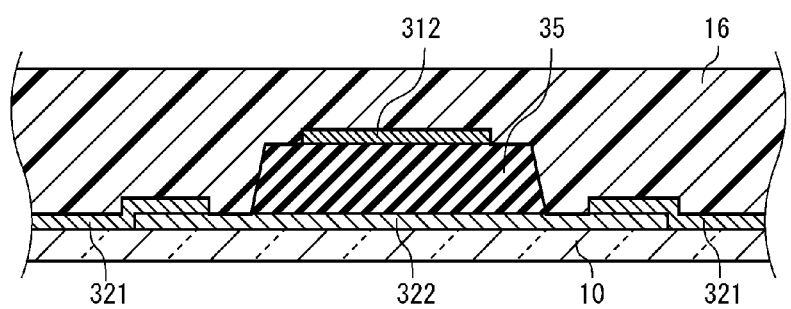
FIG. 17A is a cross-sectional view of FIG. 16 along the line A-A'.
Figure 17B:
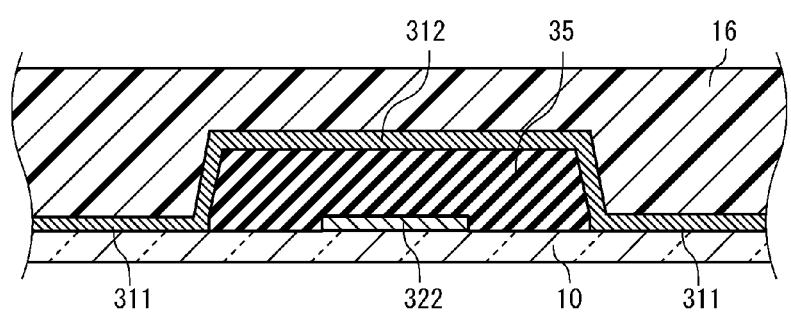
FIG. 17B is a cross-sectional view of FIG. 16 along the line B-B'.

FIG. 16 shows a magnified view of a portion where the X electrode 31 and the Y electrode 32 intersect (rectangular region S in FIG. 15B). FIG. 17A is a cross-sectional view of FIG. 16 along the line A-A'. FIG. 17B is a cross-sectional view of FIG. 16 along the line B-B'.

As shown in FIG. 16, the insulating film 35 has a rectangular shape in a plan view. The island-shaped electrodes 311 of the X electrode 31 are formed so as to cover a pair of edges 35a and 35b of the insulating film 35 that are across from each other.

In portions where the relay electrode 312 and the connecting member 322 overlap in a plan view, the width of the relay electrode 312 in the up-and-down direction in FIG. 16 (width perpendicular to the X direction) is narrower than the width of the insulating film 35 in the same direction. As a result, the Y electrode 32 and the relay electrode 312 do not contact each other.

On the other hand, it is preferable that the area of the portion of the insulating film 35 covered by neither the island-shaped electrodes 311 nor the relay electrode 312 be as small as possible. In other words, it is preferable that a length d1 in FIG. 16 be as large as possible and that a length d2 in FIG. 16 be as small as possible to the extent that the X electrode 31 does not come into contact with the Y electrode 32.

It is preferable that the length d1, which is where the insulating film 35 is covered from the edge 35a by the island-shaped electrode 311, be at least 1 μm. If the length d1 is less than 1 μm, then there are cases in which moisture or the like enters the edge 35a of the insulating film 35, which causes swelling and results in disconnections in the relay electrode 312. It is more preferable that the length d1 be at least 3 μm, and even more preferably, at least 5 μm. This similarly applies to the length of the covered portion of the edge 35b.

It is preferable that the length d2 between an edge face of the insulating film 35 parallel to the left-and-right direction (X direction) in FIG. 16 and an edge face of the relay electrode 312 parallel to the same direction be at most 20 μm. If the length d2 exceeds 20 μm, then there are cases in which moisture and the like enters the insulating film 35, which causes swelling and results in disconnections in the relay electrode 312. It is more preferable that the length d2 be at most 10 μm, and even more preferably, at most 5 μm.

It is preferable that the insulating film 35 have a tapered protrusion towards the direction opposite to the substrate 10 in a cross-sectional view. This is for a similar reason to the insulating film 15.

<Manufacturing Method for Touch Panel 3>

A manufacturing method for the touch panel 3 will be described below with reference to FIGS. 18A to 18D. FIGS. 18A to 18D are cross-sectional views along the line A-A' in FIG. 16. Descriptions of portions similar to those of the touch panel 1 will be omitted as appropriate.

An even transparent electrode film is formed on the entire surface of the insulating substrate 10 by sputtering or CVD. The connecting members 322 of the Y electrodes 32 are formed by patterning by photolithography (refer to FIG. 18A).

The terminals 13 (refer to FIG. 15A) may be formed simultaneously with the connecting members 322 or in a different step.

Next, a metal film is formed over the entire surface of the substrate 10 by sputtering or vapor deposition. The wiring lines 14 (refer to FIG. 15A) are formed by patterning by photolithography to connect the terminals 13 to the areas where the X electrodes 31 and the Y electrodes 32 are to be formed.

Photoresist is evenly coated onto the entire surface of the substrate 10 by a spin coater or a slit coater. After the coating of the photoresist, prebaking, exposure, developing, postbaking, and the like are performed, thus forming the insulating films 35 in prescribed locations (refer to FIG. 18B).

A transparent electrode film made of ITO, IZO, or the like is formed evenly over the entire surface of the substrate 10 by sputtering or CVD. Then, the island-shaped electrodes 311 of the X electrodes 31 (not shown in FIG. 18C), the relay electrodes 312, and the island-shaped electrodes 321 of the Y electrodes 32 are formed (refer to FIG. 18C) by patterning by photolithography.

If the relay electrodes 312 are too thick, then similar to the touch panel 1, they can be seen with ease by a user, and if they are too thin, then there is a possibility of disconnection due to swelling or the like in the insulating film 35. The upper limit of the thickness of the relay electrodes 312 is preferably 50 nm, and more preferably 45 nm. The lower limit of the thickness of the relay electrodes 312 is preferably 10 nm, more preferably 20 nm, and even more preferably 35 nm.

Figure 18A:
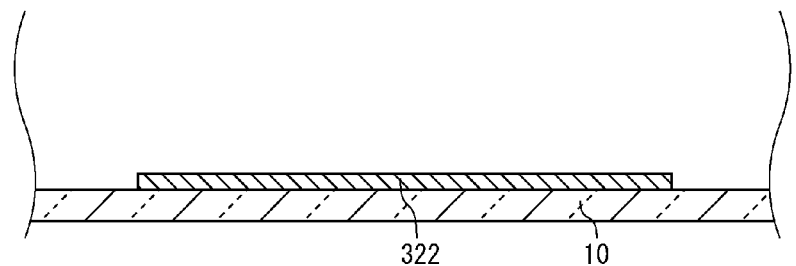
FIG. 18A is a cross-sectional view for describing a manufacturing method for the touch panel according to Embodiment 3 of the present invention.
Figure 18B:
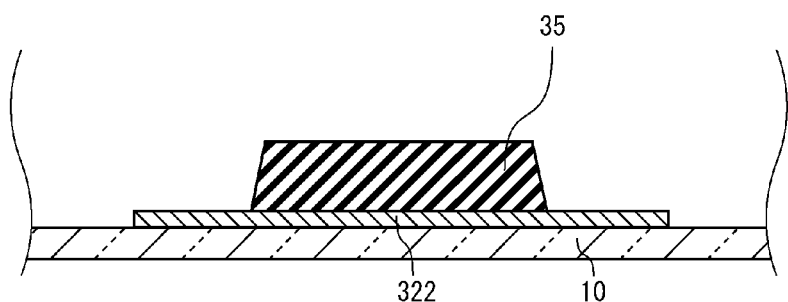
FIG. 18B is a cross-sectional view for describing a manufacturing method for the touch panel according to Embodiment 3 of the present invention.
Figure 18C:
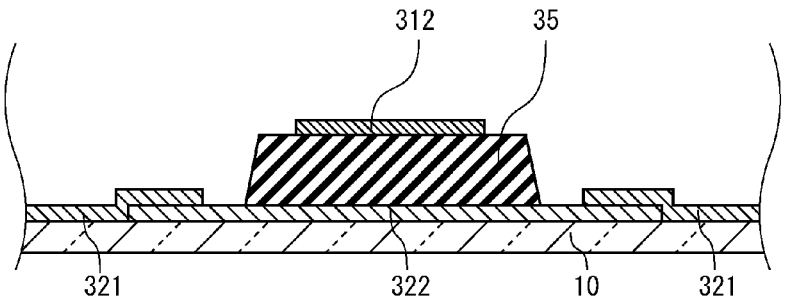
FIG. 18C is a cross-sectional view for describing a manufacturing method for the touch panel according to Embodiment 3 of the present invention.
Figure 18D:
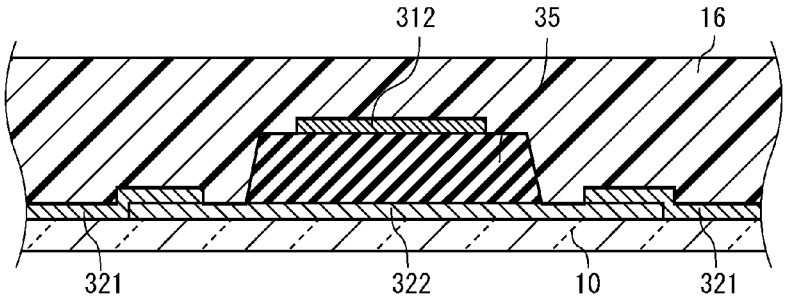
FIG. 18D is a cross-sectional view for describing a manufacturing method for the touch panel according to Embodiment 3 of the present invention.

Lastly, the protective film 16 is evenly coated by a spin coater or slit coater (refer to FIG. 18D). At this time, a metal mask or the like is used such that the protective film 16 does not cover portions of the terminals 13.

The configuration of the touch panel 3 and the manufacturing method according to Embodiment 3 of the present invention have been described above.

According to the configuration of the touch panel 3 of the present embodiment, the island-shaped electrodes 311 of the X electrodes 31 are formed so as to cover the pair of edges 35a and 35b of the insulating film 35 that are across from each other. As a result, the area of the portion of the insulating film 35 covered by neither the island-shaped electrodes 311 nor the relay electrode 312 is smaller.

As a result, in the process after the formation of the insulating film 35, the area of the insulating film 35 exposed to an alkaline solution, water, and the like is reduced. Thus, swelling of the insulating film 35 can be mitigated. Also, disconnection in the relay electrode 312 due to swelling in the insulating film 35 can be prevented.

Other Embodiments

The embodiments of the present invention were described above, but the present invention is not limited to the embodiments above, and various modifications are possible within the scope of the present invention.

In the present embodiment, the insulating films are formed in a rectangular shape in a plan view, for example. However, the insulating film may be polygonal or have an indefinite shape. Also, the edges across from each other may respectively include two or more sides.

INDUSTRIAL APPLICABILITY

The present invention can be applied to the industry of capacitive touch panels and to display devices equipped with touch panels.

The invention claimed is:
1. A touch panel, comprising:
an insulating substrate;
  first island-shaped electrodes formed on the substrate and arranged along a first direction;

second island-shaped electrodes formed on the substrate and arranged along a second direction that intersects with the first direction;

a connecting member that connects the first island-shaped electrodes;

an insulating film formed so as to cover at least a portion of the connecting member; and a relay electrode connecting the second island-shaped electrodes over the insulating film;

wherein a width of the relay electrode in a direction perpendicular to the second direction is less than a width of the insulating film in the direction perpendicular to the second direction in a portion of the relay electrode overlapping the connecting member in a plan view, and wherein a pair of entire edges of the insulating film across from each other is covered by the first island-shaped electrodes, the second island-shaped electrodes, or the relay electrode such that the edges of the insulating film, including respective corner portions, are covered with a prescribed margin that is greater than zero.

2. The touch panel according to claim 1, wherein the insulating film is rectangular in a plan view and four corners thereof are covered by the first island-shaped electrodes, the second island-shaped electrodes, or the relay electrode.

3. The touch panel according to claim 1, wherein at least 1 µm each of the pair of edges of the insulating film across from each other are covered.

4. The touch panel according to claim 1, wherein the relay electrode is 10 to 50 nm in thickness.

5. The touch panel according to claim 1, wherein the pair of edges of the insulating film across from each other are covered by the relay electrode.

6. The touch panel according to claim 5, wherein a length from an edge face of the insulating film parallel to the second direction to an edge face of the relay electrode parallel to the second direction is 20 µm or less in the portion of the relay electrode overlapping the connecting member in a plan view.

7. The touch panel according to claim 1, wherein the pair of edges of the insulating film across from each other are covered by the first island-shaped electrodes.

8. The touch panel according to claim 1, wherein the pair of edges of the insulating film across from each other are covered by the second island-shaped electrodes.

9. The touch panel according to claim 8, wherein a length from an edge face of the insulating film parallel to the second direction to an edge face of the relay electrode parallel to the second direction is 20 µm or less in the portion of the relay electrode overlapping the connecting member in a plan view.

10. A display device, comprising:

a liquid crystal display device; and a touch panel coupled with the liquid crystal display device, the touch panel comprising:

an insulating substrate;

first island-shaped electrodes formed on the substrate and arranged along a first direction;

second island-shaped electrodes formed on the substrate and arranged along a second direction that intersects with the first direction;

a connecting member that connects the first island-shaped electrodes;

an insulating film formed so as to cover at least a portion of the connecting member; and a relay electrode connecting the second island-shaped electrodes over the insulating film;

wherein a width of the relay electrode in a direction perpendicular to the second direction is less than a width of the insulating film in the direction perpendicular to the second direction in a portion of the relay electrode overlapping the connecting member in a plan view, and wherein a pair of entire edges of the insulating film across from each other is covered by the first island-shaped electrodes, the second island-shaped electrodes, or the relay electrode such that the edges of the insulating film, including respective corner portions, are covered with a prescribed margin that is greater than zero.

* * * * *